Oct. 23, 1962
H. C. FLINT
3,059,967
SEAT CONSTRUCTION
Filed Sept. 26, 1960
4 Sheets-Sheet 2
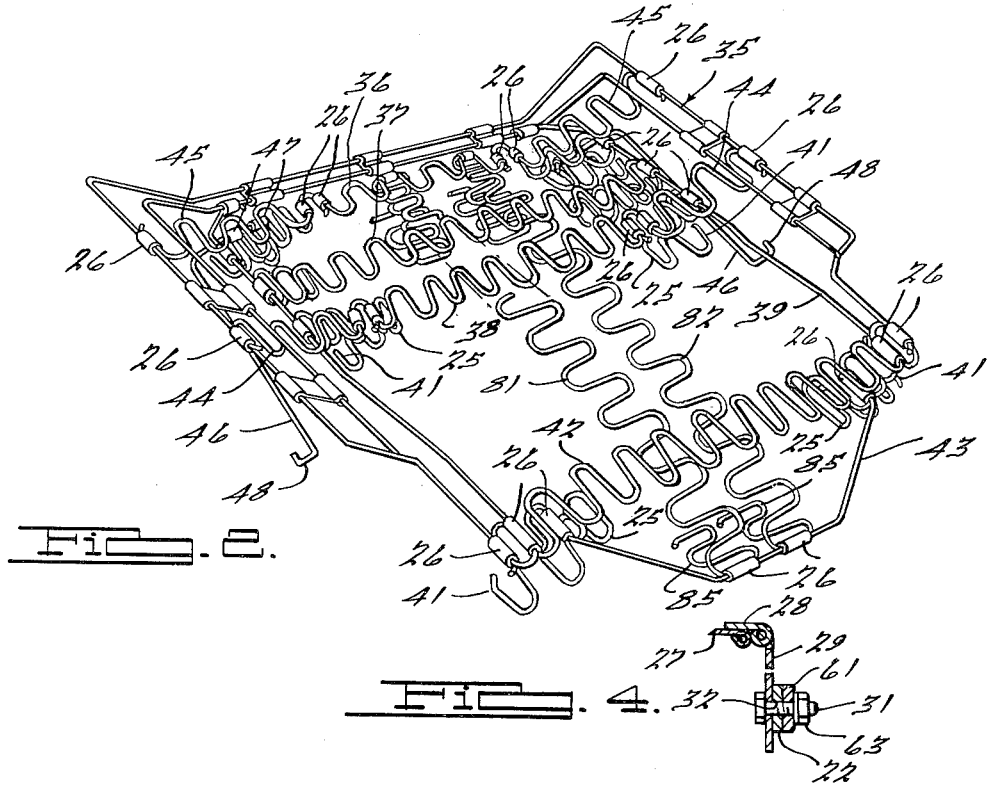
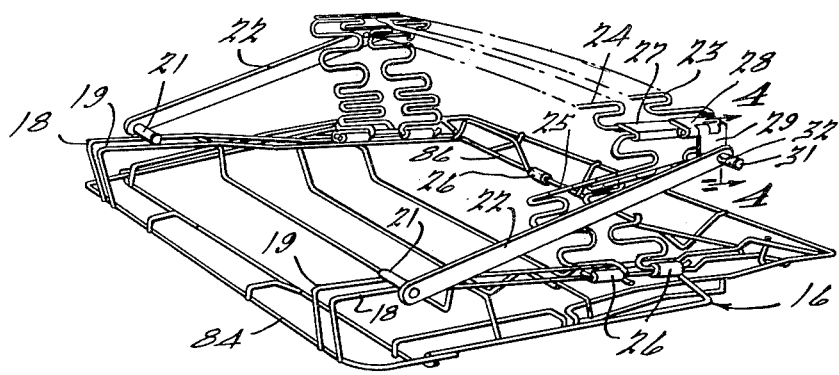
INVENTOR.
Hyland C. Flint.
BY
Harness, Dickey & Pierce.
ATTORNEYS.

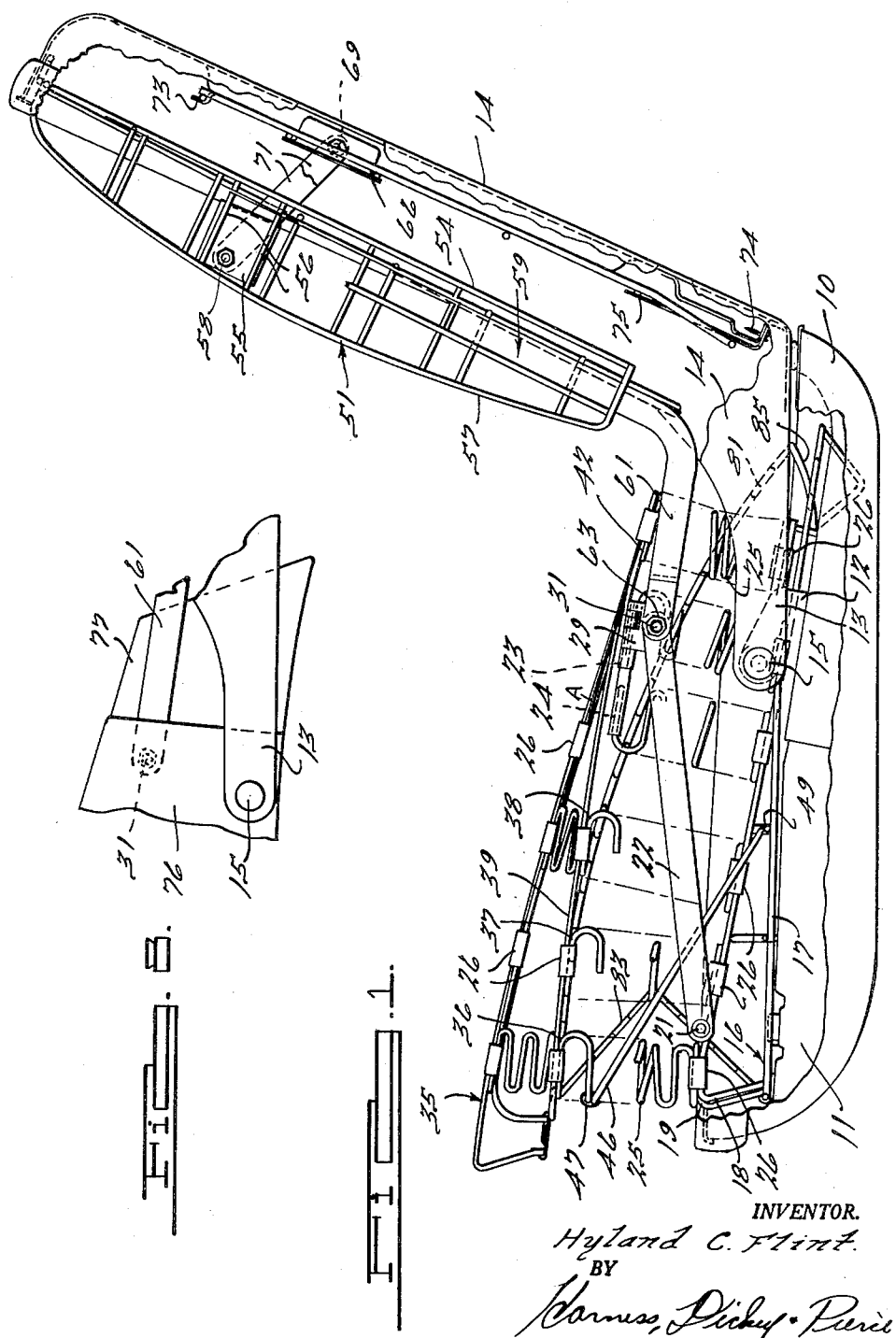

Oct. 23, 1962  H. C. FLINT  3,059,967
SEAT CONSTRUCTION
Filed Sept. 26, 1960  4 Sheets-Sheet 3

INVENTOR.
Hyland C. Flint.
BY
Barnes, Dickey & Pierce
ATTORNEYS.

Oct. 23, 1962 H. C. FLINT 3,059,967
SEAT CONSTRUCTION
Filed Sept. 26, 1960 4 Sheets-Sheet 4
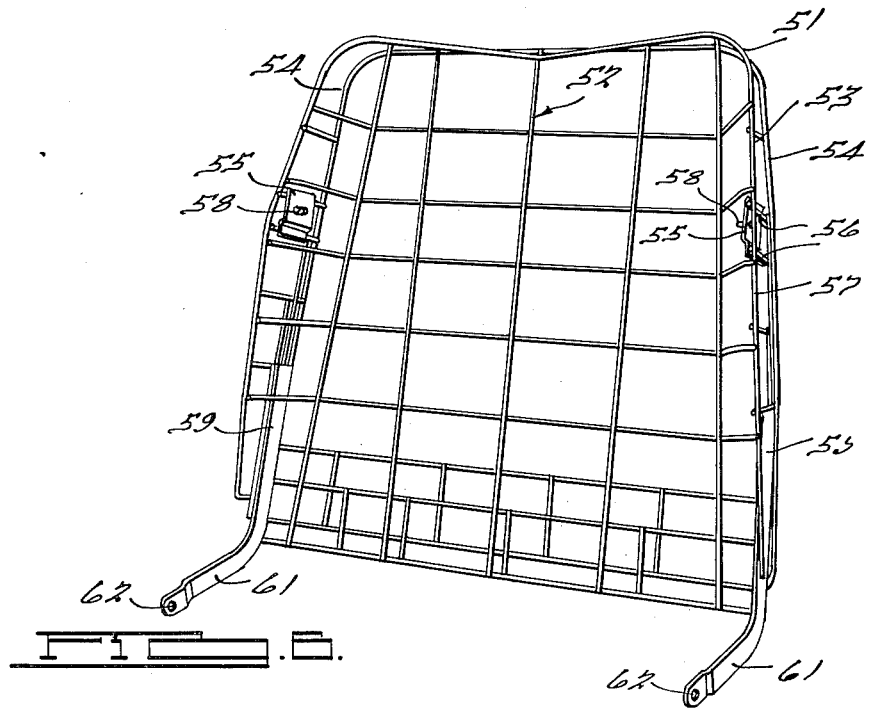
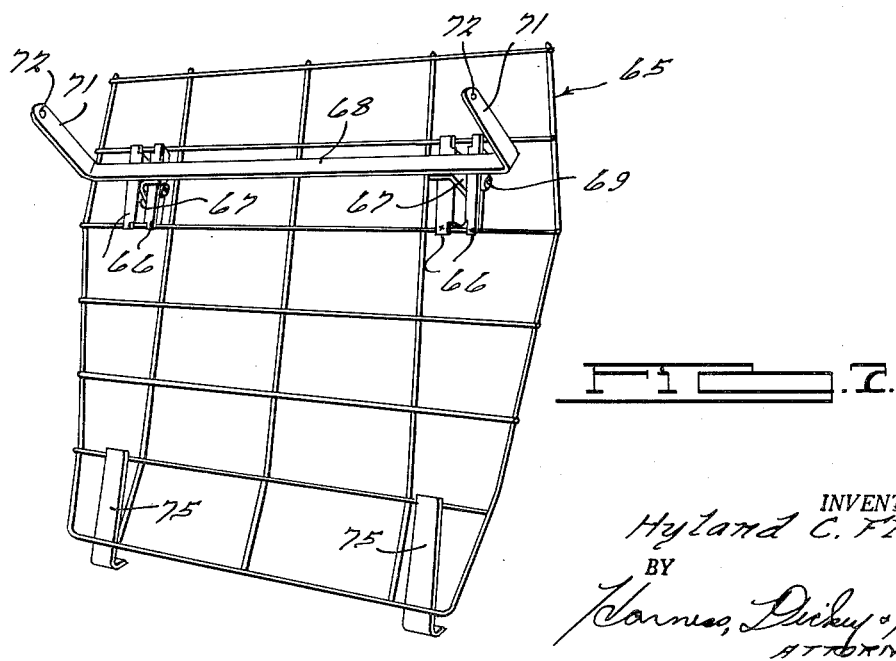
INVENTOR.
Hyland C. Flint.
BY
Harness, Dickey & Pierce
ATTORNEYS

United States Patent Office 3,059,967
Patented Oct. 23, 1962

3,059,967
SEAT CONSTRUCTION
Hyland C. Flint, Novi, Mich.
(3551 Walnut Lake Road, Rte. 2, Orchard Lake, Mich.)
Filed Sept. 26, 1960, Ser. No. 58,449
20 Claims. (Cl. 297—309)

This invention relates to unison action seats, and particularly to a unison action seat having a back cushion movable with the seat cushion independent of a supporting back element which is tiltable forwardly with the back cushion.

The seat herein illustrated is of a bucket type for a single occupant but the same construction could be applied to a full-across seat for the vehicle which would support three people. Pivots for a pan-like back element and a back cushion are so related that the back element and the back cushion may be tilted forwardly without interference. Pivots for arms of the back cushion are universally supported and may move when the back element and seat cushion are tilted forwardly. A hinge wing permits two transverse spring strips to float and not be bound by the connection to the forwardly extending arms of the back cushion. The two spring strips control the movement of the back cushion directly from the point of concentrated load and no binding occurs when producing the unison movement with the back cushion. Other load bearing springs and their connections to the border wire are independent of the two springs which produce the upward and downward movement of the back cushion and immediate and full response occurs to the movement of the load at the A point of the seat cushion without any interference from any other element thereof.

Accordingly, the main objects of the invention are: to provide a unison action seat structure having a fixed back element which is tiltable forwardly and which supports a back cushion for up and down movement with springs of the seat cushion and for forward tilting movement therewith; to form a unison action seat from a seat cushion having the load supporting spring elements at the A point of the cushion supported independently of the other spring elements thereof and connected to the back cushion in a manner to directly and independently control the up and down movement of the back cushion therewith; to provide a seat cushion having a pair of transverse spring elements connected at the side edges in a manner to support hinged plates containing a stud which is connected to the forwardly extending arms of a vertically movable back cushion to have the studs free to move in any direction when the spring elements and the back cushion are moved in unison; to support a back cushion on a pivoted yoke on a back element which is pivoted to the base for forward tilting movement with a seat cushion, the forwardly extending arms of which are pivoted by studs on a hinge wing at each side of the supporting spring portion which moves the back cushion vertically in response to the movement of a load thereon and which is tiltable forwardly with the back element; to provide a unison action seat with a back and seat cushion which deflect in unison and which may be trimmed while in unit relation to each other independently of the base and the back support to which the units are attached after being completely trimmed, and, in general, to provide a unison action seat which is simple in construction, sensitive to deflection changes of the load, and which is economical of manufacture.

Other objects and features of novelty of the invention will be specifically pointed out or will become apparent when referring, for a better understanding of the invention, to the following description taken in conjunction with the accompanying drawings in which:

FIGURE 1 is a broken view in elevation of an untrimmed unison action seat embodying features of the present invention;

FIGURE 2 is a perspective view of a separate spring unit employed in the seat cushion of FIG. 1;

FIGURE 4 is a broken sectional view of the structure illustrated in FIGURE 3, taken on the line 4—4 thereof;

FIGURE 5 is a front view in elevation of a seat back cushion frame and the supporting element therefor;

FIGURE 6 is a perspective view of the back cushion frame illustrated in FIG. 5 when separated from its support and the back element;

FIGURE 7 is a perspective view of a frame which supports the back cushion frame of FIG. 6 and which is attachable to the back element as illustrated in FIG. 5; and FIGURE 8 is a broken view of a portion of the seat cushion illustrated in FIG. 1 after trim material is applied thereto.

Figure 3:
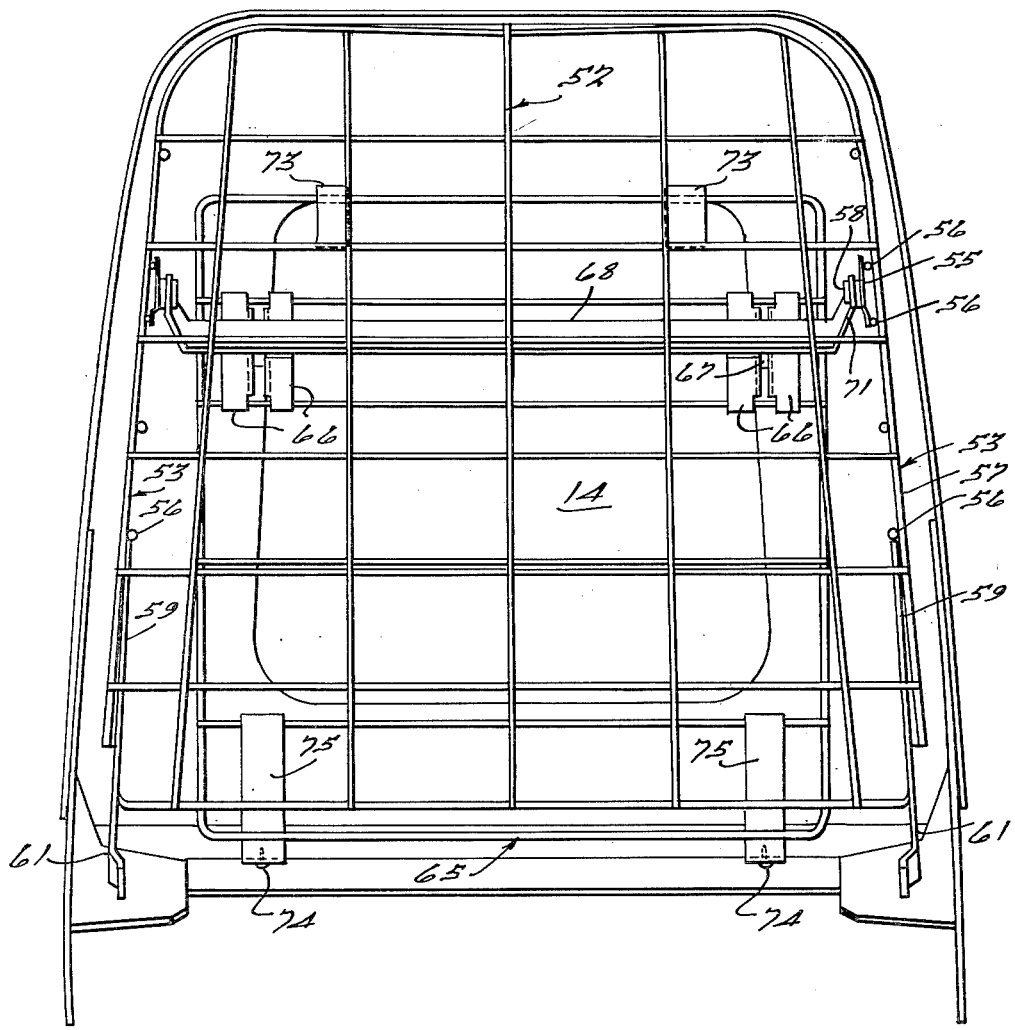
FIGURE 3 is a perspective view of a base portion of a seat cushion to which the unit of FIG. 2 is applied.

A base shell 10 has inverted channel-shaped side rails 11 provided with upstanding flanges 12 to which forwardly extending arms 13 of a back element 14 are secured by pivots 15. A wire base frame 16 is secured to the rails 11, as illustrated in FIGS. 1 and 3. The base frame has a base grid 17 supporting a pair of spaced sloping wires 18 and 19 at each side thereof. The pair of sloping wires support the ends of the spring strips forming the load bearing area and since all of the spring strips are alike a resulting rearward slope will be provided to the top of the seat cushion. A stud 21 is welded across each pair of wires 18 and 19 near the front end to extend laterally therefrom for pivotally securing the forward end of the stabilizing links 22 through which the studs extend. Rearwardly of the center of the base frame 16, a pair of spring strips 23 and 24 are provided, having outwardly presenting V-shaped supporting end portions 25, the ends of which are secured by bands 26 to the wires 18 at the sides of the base frame 16. The ends of the top load bearing section of the spring strips 23 and 24 are secured together by the channel-shaped element 27, the side flanges of which are rolled about the straight edge portions of the spring strips to retain the two spring strips in fixed unit relation to each other. The elements 27 have a wing 28 of a hinge welded or otherwise secured thereto, the hinge wing 29 thereof having a stud 31 welded or otherwise secured thereto. The outer end of the links 22 has an aperture 32 which receives the studs 31 and controls the position of the springs 23 and 24 which move freely due to the universally movable stud 31.

Similar spring elements illustrated in FIG. 2 cooperate with the spring elements 23 and 24 to form a load bearing surface and support a border unit 35 independent of the spring elements. Forward spring elements 36, 37, and 38 have the ends of the top surface secured to a border wire 39 by bands 26. The ends 41 of the V-shaped supporting portions 25 of the spring elements are left free in position to be connected to the wires 18 of the base frame 16 by bands 26, as clearly illustrated in FIGS. 1 and 2.

A rearward spring element 42 has the straight portion inwardly of the ends of the load bearing area secured to the border wire 39 by bands 26. A U-shaped border wire 43 has the ends secured to the top section of the V-shaped supporting portions 25 of the spring element 42 by bands 26. The ends 41 of the spring strip 42 are secured to the rear portion of the wires 18 of the base frame 16 by bands 26. The forward outwardly and upwardly disposed portion of the border frame 35 is supported by the ends of upwardly arched spring strips 44 and 45 at each side of the cushion. The inner ends of the strips are secured by a pair of bands 26 to adjacent straight portions of the spring elements 36 and 38, inwardly of the ends of the top surface thereof against downward pivotal movement. The outer ends of the spring strips 44 and 45 are secured to the outermost wires of the border frame by bands 26. Brace wires 46 are secured to each side of the cushion assembly by clips 47 which secure the right-angle inwardly disposed portion thereof to the front edge of the spring element 36. The unit thus constructed is mounted on the base frame 16 by connecting the ends 41 of each spring strip to the side edge wires 18 thereof and connecting the ends 48 of the brace wires 46 to the wire 17 of the base frame by clips 49, as illustrated in FIG. 1. The brace wires stabilize the load bearing top area against forward and rearward movement and when confined by the links 22 prevents the sideward movement thereof. The unit thus formed may be padded and trimmed in the usual manner before being mounted upon the side rails 11 within the base shell 10.

The back cushion supporting grid element 51, illustrated more specifically in FIGS. 5, 6, and 7, has a central section 52 having side sections 53 which extend frontwardly of side base sections 54. A plate 55 is secured to spacing bars 56 secured between the side sections 54 and the outwardly extending border wire 57 of the sections 53 at each side of the cushion. Inwardly extending studs 58 are welded or otherwise secured to each of the plates 55 in aligned relation to each other. The vertical branch of the L-shaped elements 59 are welded to the lower spacing bars 56 to have the forwardly extending arm section 61 disposed below the grid element. The arm sections 61 have apertures 62 which receive the studs 31 of the hinged wings 29 secured in pivotal relation thereon by a nut 69, as illustrated in FIGS. 1 and 4.

A grid supporting frame 65, illustrated in FIG. 7, has a pair of spaced brackets 66 at upper side portions thereof which pivotally support arms 67 of a yoke 68 on bolts 69. The yoke 68 has extending arms 71 containing apertures 72 which receive the studs 58 of the plates 55 to pivotally support the back frame for upward and downward movement on the grid frame 65. As illustrated in FIGS. 1 and 5, the grid frame is secured to the back shell 14 by brackets 73 secured in position by screws 74 extending through the bottom legs of angle-shaped brackets 75. The back frame is also trimmed before being mounted on the back shell. A covering material is applied over the grid frame and sponge rubber is placed thereover on the flat area 52 and the forwardly extending side portions 53 to form encompassing side sections for the occupant of the seat. The assembly is trimmed in a manner to have the arm sections 61 extend between overlapping portions 76 and 77 of the trim material and pivotally supported on the studs 31. Thus, the forwardly extending arm sections 61 are free to move upwardly and downwardly relative to the trim material.

The springs 23 and 24 are located at the A point of the seat cushion and respond to the weight and movement of the occupant independently of the other elements of the cushion except for the forwardly and rearwardly disposed spring elements 81 and 82 disposed therebelow. Each of these spring elements has a forward V-shaped supporting end 83 which is secured to the forward base wire 84 by bands 26 and a downwardly and forwardly arched rear supporting portion 85 secured to a rearward base wire 86 by bands 26. The spring elements 81 and 82 are spaced beneath the spring elements 36, 37, 38, 23, 24, and 42, as illustrated in FIG. 1, and the major part of the load is supported by these spring elements. Upon an increase in load, a certain portion thereof is transferred to the spring elements 81 and 82 which are deflected downwardly along with the loaded spring elements. The ends of the spring elements 23 and 24 are capable of rotating about the center of the studs 31 from a horizontal plane and are free to tilt in a vertical plane in view of the hinged wing 29 which supports the stud. There is therefore no resistance to the deflection of the spring elements 23 and 24 which occurs independent of the spring elements 36, 37, 38, and 42 and the border unit 35. The deflection of the spring elements 23 and 24 produces the downward movement of the back frame 51 in unison therewith through the connection of the arm portions 61 with the studs 31 at the ends of the spring strip 23 and 24. The upward and downward movement of the back cushion 51 follows precisely the upward and downward movement of the studs 31 and the ends of the spring elements 23 and 24 independently of other elements of the seat cushion. The spring elements 23 and 24 are stabilized by the links 22 which are pivoted to the studs 31 at the ends of the elements and to the studs 21 secured to the base frame 16. The studs 31 are free to move substantially vertically in an arc about the studs 21 which permits the back shell 14, along with the back frame 51 supported thereby, to be tilted forwardly about the pivots 15 and 31 without any binding occurring therebetween.

A unison action seat has been provided, supported on a base within a back shell in a manner to permit forward tilting movement of the back shell and cushion. The seat and back cushions are constructed independently and are completely upholstered before being attached to the base and back shell. The seat cushion has spring elements independently supported at the A portion thereof and directly connected to the back cushion through the forwardly extending arms thereof. The arms and the back cushion move upwardly and downwardly in response to the upward and downward movement of the isolated spring elements at the A point of the cushion. The spring elements at the A point are mounted independently of the other elements of the seat cushion with the ends attached to studs in a manner which permits the ends of the elements to have universal movement. The spring elements are entirely unrestricted and respond accurately to a load being applied thereto which is transferred without restriction to the back cushion which moves in response to the movement of the spring element at the A point of the seat cushion. While the back shell may be maintained fixed to the base shell, arms are illustrated as being extended forwardly and mounted on pivots 15 which permit the shell to be tilted forwardly to increase the ingress room to the back seat area. The back cushion frame 51 tilts forwardly with the back shell on the studs 31 to which the arm sections 61 thereof are secured. The top load supporting area is stabilized from forward and rearward movement by side brace wires 46 which assist the links 22 to stabilize the area against sideward movement.

What is claimed is:

1. In a seat construction, a base, a first group of spring strips spanning said base, a frame, and a second group of spring strips adjacent to said first group when secured to said frame and base to be disposed in the plane of the seating area a portion of which is provided by said first group, said two groups forming a single load bearing area for an occupant.

2. In a seat construction, a base, a first group of spring strips spanning said base, a second group of spring strips spanning said base and independent of said first group, both groups of spring strips forming a single load bearing area for an occupant, pivots at opposite ends of the first group of spring strips, a back cushion supported for vertical movement, and forwardly extending arms on said back cushion secured to said pivots whereby the back cushion moves with the first group of spring strips independent of said second group thereof.

3. In a seat construction, a base, spring strips mounted on said base forming the main load bearing area thereof, pivots mounted on hinged leaves at the ends of at least one of said spring strips, a back cushion having forwardly extending fixed arms supported on said pivots, a back member having forwardly extending arms pivoted to said base, and an element pivotally joining the back cushion to said back member permitting vertical movement of the back cushion and the forward tilting of the back member and the cushion.

4. In a seat construction, a base, spring strips mounted on said base forming the main load bearing area thereof, pivots mounted on hinged leaves at the ends of at least one of said spring strips, a back cushion having forwardly extending arms supported on said pivots, a back member having forwardly extending arms pivoted to said base, an element pivotally joining the back cushion to said back member permitting vertical movement of the back cushion and the forward tilting of the back member and the cushion, and links having one end connected to said pivots and the opposite end connected to said base.

5. In a seat construction, a base, spring strips mounted on said base forming the main load bearing area thereof, pivots mounted on hinged leaves at the ends of at least one of said spring strips, a back cushion having forwardly extending arms supported on said pivots, a back member having forwardly extending arms pivoted to said base, an element pivotally joining the back cushion to said back member permitting vertical movement of the back cushion and the forward tilting of the back member and the cushion, links having one end connected to said pivots and the opposite end connected to said base, and bracing wires joining the spring strips to said base from the front toward the rear thereof for stabilizing the load bearing area formed thereby.

6. In a seat construction, a base, spring strips mounted on said base forming the main load bearing area thereof, pivots mounted on hinged leaves at the ends of at least one of said spring strips, a back cushion having forwardly extending arms supported on said pivots, a back member having forwardly extending arms pivoted to said base, an element pivotally joining the back cushion to said back member permitting vertical movement of the back cushion and the forward tilting of the back member and the cushion, links having one end connected to said pivots and the opposite end connected to said base, bracing wires joining the spring strips to said base from the front toward the rear thereof for stabilizing the load bearing area formed thereby, and additional spring strips extending from the foremost spring strip rearwardly and downwardly in spaced relation to the rearmost spring strips and substantially in the center thereof.

7. In a seat construction, a base, spring strips mounted on said base forming the main load bearing area thereof, pivots mounted on hinged leaves at the ends of at least one of said spring strips, a back cushion having forwardly extending arms supported on said pivots, a back member having forwardly extending arms pivoted to said base, an element pivotally joining the back cushion to said back member permitting vertical movement of the back cushion and the forward tilting of the back member and the cushion, links having one end connected to said pivots and the opposite end connected to said base, bracing wires joining the spring strips to said base from the front toward the rear thereof for stabilizing the load bearing area formed thereby, additional spring strips extending from the foremost spring strip rearwardly and downwardly in spaced relation to the rearmost spring strips and substantially in the center thereof, and a border element supported by upwardly directed spring elements secured to certain of said spring strips and independent of the spring strip ends to which the pivots are supported.

8. In a seat construction, a base, spring strips mounted on said base forming the main load bearing area thereof, pivots mounted on hinged leaves at the ends of at least one of said spring strips, a back cushion having forwardly extending arms supported on said pivots, a back member having forwardly extending arms pivoted to said base, an element pivotally joining the back cushion to said back member permitting vertical movement of the back cushion and the forward tilting of the back member and the cushion, links having one end connected to said pivots and the opposite end connected to said base, bracing wires joining the spring strips to said base from the front toward the rear thereof for stabilizing the load bearing area formed thereby, additional spring strips extending from the foremost spring strip rearwardly and downwardly in spaced relation to the rearmost spring strips and substantially in the center thereof, a border element supporting by upwardly directed spring elements secured to certain of said spring strips and independent of the spring strip ends to which the pivots are supported, upholstery material on said back cushion, and upholstery material on said base spring strips, portions of said material overlapping at each side of the base to permit the arms of the back cushion to pass therebetween when engaging said pivots.

9. In a cushion construction, a base, a frame mounted on said base having a pair of like spring strips spanning the frame near the rear of the frame, means connecting said two spring strips together at the ends of the load bearing area thereof, a stud swingably secured on said connecting means, a stud on said frame, and a link at each side of the frame pivoted on said studs.

10. In a cushion construction, a base, a frame mounted on said base having a pair of like spring strips spanning the frame near the rear of the frame, means connecting said two spring strips together at the ends of the load bearing area thereof, a stud swingably secured on said connecting means, a stud on said frame, a link at each side of the frame pivoted on said studs, and a second wire frame having spring strips thereon similar to said first spring strips disposed forwardly and rearwardly thereof, the supporting ends of said latter spring strips being secured to said frame with the top areas of all said spring strips forming the main load bearing section of the seat cushion.

11. In a cushion construction, a base, a frame mounted on said base having a pair of like spring strips spanning the frame near the rear of the frame, means connecting said two spring strips together at the ends of the load bearing area thereof, a stud swingably secured on said connecting means, a stud on said frame, a link at each side of the frame pivoted on said studs, a second wire frame having spring strips thereon similar to said first spring strips disposed forwardly and rearwardly thereof, the supporting ends of said latter spring strips being secured to said frame with the top areas of all said spring strips forming the main load bearing section of the seat cushion, and a border frame supported on certain of said spring strips by spring sections extending outwardly and upwardly therefrom and independent of said pair of spring strips supporting the studs.

12. In a cushion construction, a base, a frame mounted on said base having a pair of like spring strips spanning the frame near the rear of the frame, means connecting said two spring strips together at the ends of the load bearing area thereof, a stud swingably secured on said connecting means, a stud on said frame, a link at each side of the frame pivoted on said studs, a second wire frame having spring strips thereon similar to said first spring strips disposed forwardly and rearwardly thereof, the supporting ends of said latter spring strips being secured to said frame with the top areas of all said spring strips forming the main load bearing section of the seat cushion, a border frame supported on certain of said spring strips by spring sections extending outwardly and upwardly therefrom and independent of said pair of spring strips supporting the studs, and a pair of spring strips extending parallel to the sides of said frame sloping downwardly to be in greater spaced relation at the rearmost spring strip which assist in supporting the load after the main load bearing areas of the spring strips have been deflected beyond a predetermined amount.

13. In a cushion construction, a base, a frame mounted on said base having a pair of like spring strips spanning the frame near the rear of the frame, means connecting said two spring strips together at the ends of the load bearing area thereof, a stud swingably secured on said connecting means, a stud on said frame, a link at each side of the frame pivoted on said studs, a second wire frame having spring strips thereon similar to said first spring strips disposed forwardly and rearwardly thereof, the supporting ends of said latter spring strips being secured to said frame with the top areas of all said spring strips forming the main load bearing section of the seat cushion, a border frame supported on certain of said spring strips by spring sections extending outwardly and upwardly therefrom and independent of said pair of spring strips supporting the studs, a pair of spring strips extending parallel to the sides of said frame sloping downwardly to be in greater spaced relation at the rearmost spring strip which assist in supporting the load after the main load bearing areas of the spring strips have been deflected beyond a predetermined amount, a back element having forwardly extending arms pivoted to the base beneath said studs on the spring strips, a wire frame having aligned studs thereon, a second wire frame securable within said back element having pivots, and a yoke secured on the wire frame pivots and studs.

14. In a cushion construction, a base, a frame mounted on said base having a pair of like spring strips spanning the frame near the rear of the frame, means connecting said two spring strips together at the ends of the load bearing area thereof, a stud swingably secured on said connecting means, a stud on said frame, a link at each side of the frame pivoted on said studs, a second wire frame having spring strips thereon similar to said first spring strips disposed forwardly and rearwardly thereof, the supporting ends of said latter spring strips being secured to said frame with the top areas of all said spring strips forming the main load bearing section of the seat cushion, a border frame supported on certain of said spring strips by spring sections extending outwardly and upwardly therefrom and independent of said pair of spring strips supporting the studs, a pair of spring strips extending parallel to the sides of said frame sloping downwardly to be in greater spaced relation at the rearmost spring strip which assist in supporting the load after the main load bearing areas of the spring strips have been deflected beyond a predetermined amount, a back element having forwardly extending arms pivoted to the base beneath said studs on the spring strips, a wire frame having aligned studs thereon, a second wire frame securable within said back element having pivots, a yoke secured on the wire frame pivots and studs, padding and upholstery material provided on said back frame, and padding and upholstery material on said seat frame, with the trim material on the latter overlapping at the sides to provide slots through which the arms of said back frame may extend into pivotal engagement with the studs on said spring strips.

15. In a seat and back construction mounted on a base, a seat cushion having upholstery material and universally mounted studs in the rear side portions thereof extending outwardly of said material, a back cushion having arms fixed thereto and pivoted on said studs, and a back member enclosing the back of said cushion and pivotally supported on said base and to said back cushion in a manner to permit the back member and back cushion to pivot forwardly over the seat cushion.

16. In a seat and back construction mounted on a base, a seat cushion having universally mounted studs in the rear side portions thereof, a back cushion having arms pivoted on said studs, a back member pivotally supported on said base and to said back cushion in a manner to permit the back support and cushion to pivot forwardly over the seat cushion, and a link at each side of the seat cushion pivoted to said studs and to said base.

17. In a seat construction, a seat cushion having spring strips forming a load bearing area with at least one spring strip supported independent of the other spring strips within said area substantially in the plane thereof, studs universally mounted on the ends of said one spring strip, and a back cushion mounted for vertical movement and connected to said strips.

18. In a seat construction, a seat cushion having spring strips forming a load bearing area with at least one spring strip supported independent of the other spring strips within said area substantially in the plane thereof, studs universally mounted on the ends of said one spring strip, and a back cushion mounted for vertical movement and connected to said strips, said mounting for said back cushion embodying a forwardly tiltable member to which the back cushion is pivoted and tiltable forwardly therewith.

19. In a seat construction, a seat cushion having spring strips forming a load bearing area with at least one spring strip supported independent of the other spring strips, studs universally mounted on the ends of said one spring strip, a back cushion mounted for vertical movement and connected to said strips, said mounting for said back cushion embodying a forwardly tiltable member to which the back cushion is pivoted and tiltable forwardly therewith, said forwardly tiltable member being in the nature of a pan, and a grid removably supported in said pan, said pivot for the back cushion being a yoke with ends pivoted to the grid and to the back cushion.

20. In a seat construction, a seat cushion having spring strips forming a load bearing area with at least one spring strip supported independent of the other spring strips, studs universally mounted on the ends of said one spring strip, a back cushion mounted for vertical movement and connected to said strips, said mounting for said back cushion embodying a forwardly tiltable member to which the back cushion is pivoted and tiltable forwardly therewith, said forwardly tiltable member being in the nature of a pan, a grid removably supported in said pan, said pivot for the back cushion being a yoke with ends pivoted to the grid and to the back cushion, and fixed pivots on which the member in the nature of a pan is tiltable with the back cushion which is supported on the universally mounted studs.

References Cited in the file of this patent

UNITED STATES PATENTS

| | | |
|---|---|---|
| 1,762,623 | Hess | June 10, 1930 |
| 2,042,238 | Otto | May 26, 1936 |
| 2,163,751 | Flint | June 27, 1939 |
| 2,373,751 | Flint | Apr. 17, 1945 |
| 2,832,397 | Premo | Apr. 29, 1958 |
| 2,925,120 | Flint | Feb. 16, 1960 |
| 2,936,823 | Neely | May 17, 1960 |